UNITED STATES PATENT OFFICE.

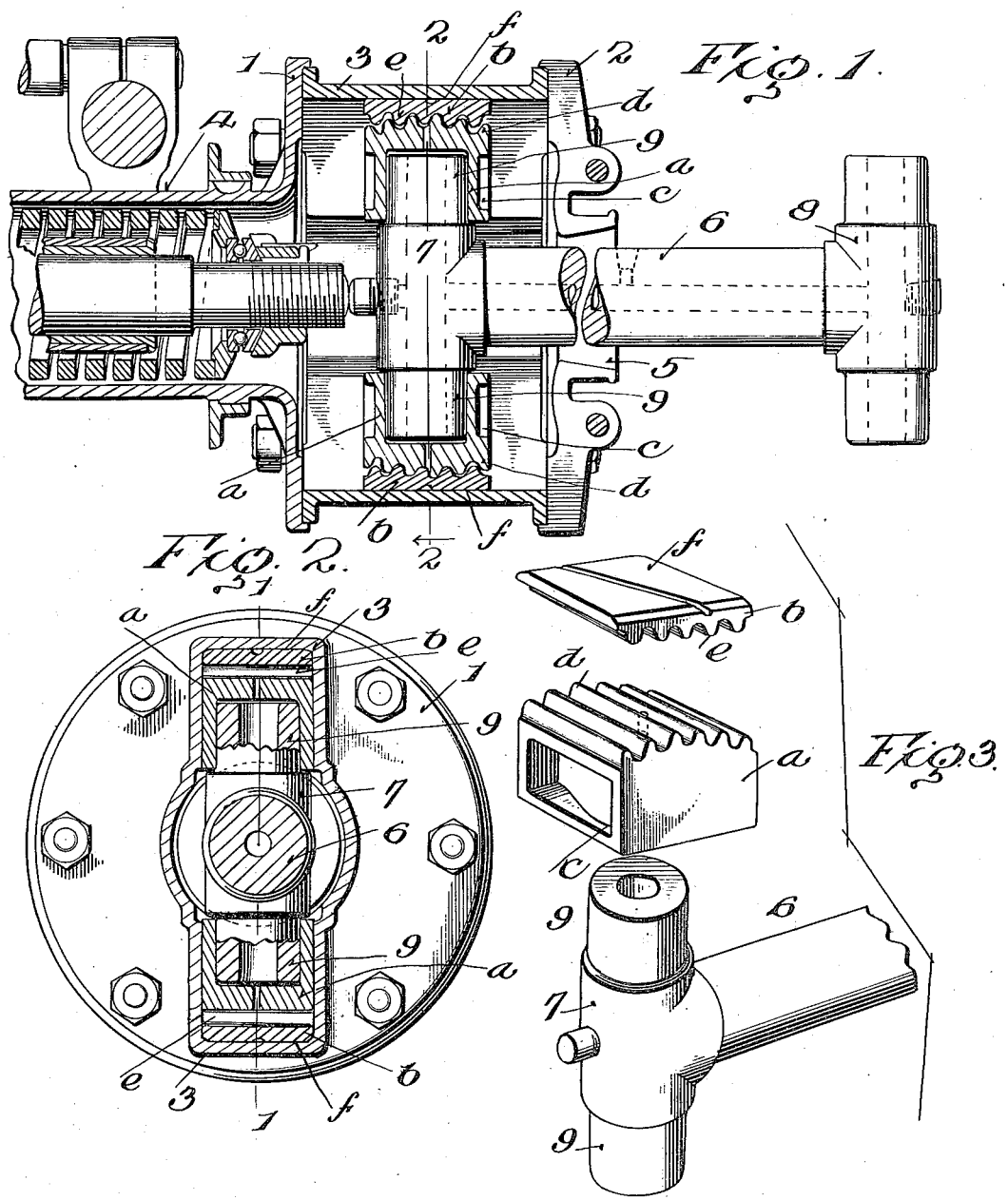

PRESTON H. BREED, OF PITTSFIELD, MASSACHUSETTS, ASSIGNOR TO ALDEN SAMPSON MANUFACTURING COMPANY, OF PITTSFIELD, MASSACHUSETTS.

UNIVERSAL JOINT.

952,413.  Specification of Letters Patent.  Patented Mar. 15, 1910.

Application filed November 13, 1909. Serial No. 527,922.

*To all whom it may concern:*

Be it known that I, PRESTON H. BREED, a citizen of the United States, residing at Pittsfield, in the county of Berkshire and State of Massachusetts, have invented certain new and useful Improvements in Universal Joints, of which the following is a specification, reference being had therein to the accompanying drawing.

My invention relates to improvements in universal joints, and is of the box-type, wherein the moving parts are inclosed within a box-like structure.

In the box-type of universal joints known to me, the block within the box has had its bearing surface made on a curved line which forms only a line contact to take care of the wear of the block caused between the parts due to the pressure of the weight of the parts and the centrifugal force.

The object of the present invention is to so arrange and construct the wearing surface between the block and the box that the area of the wearing surface is greatly increased, thus preventing the quick wearing of the parts and the consequent lost motion between them, and to lengthen the life of the parts.

In the accompanying drawings: Figure 1 is a longitudinal central sectional view on the line 1, 1, of Fig. 2. Fig. 2 is a transverse sectional view on the line 2, 2, of Fig. 1. Fig. 3 is a detached perspective view of the T-head and the improved wearing block.

Referring now to the drawings, the box is made up of the end pieces or walls 1 and 2, and the intermediate wall portion 3. The end wall 1 is connected in any suitable manner with either the driving power or the object to be driven (not shown) through the medium of the member 4. The opening 5 is formed in the opposite end wall 2, and passing through this end wall into the box is the driving or driven shaft 6, as the case may be. The inner end of this shaft is provided with a cross-head 7, thus forming on the inner end of the shaft 6, a T-shaped head. Where more than one universal joint is to be in the line of shafting, the opposite end 6 of the shaft will be provided with a T-head 8, similar to the one 7, and this T-head will be within the box and will have arranged therewith the improvements which will now be explained.

In the box-type of universal joints known to me, blocks are placed upon the ends 9 of the T-head 7, and these blocks engage the inner surface of the intermediate wall 3. As previously stated, the engaging surface of these blocks with the inner surface of the wall 3, has heretofore been formed on a curved line which afforded only a line contact between the block and wall 3, and by reason of this small contact surface would quickly wear, causing a lost motion and a rattling between the parts, and by reason of which accurate fitting of the parts was short lived. The present improvement pertains to this block or blocks which are between the ends of the T-head and inner surface of the wall 3.

The improved block consists of the two parts *a*, *b*, the part *a* is provided with an opening *c*, which receives the end 9 of the T-head. The outer surface of the part *a* is provided with teeth *d* which extend in a direction transverse the shafting, and these teeth *d* mesh with correspondingly shaped teeth *e* formed upon the inner side of the part *b* of the block, while the outer straight surface *f* of the block is in engagement with the straight inner surface of the wall 3. By reason of this construction a broad wearing surface between the block and the inner surface of the wall 3 is provided and a plurality of wearing surfaces is provided between the two parts of the block as contradistinguished between a single line contact or wearing surface between the outer end of the block and the inner surface of the wall 3.

Attention is directed to the fact that the teeth *d* upon the part *a* of the block are formed on an arc of a circle, whereas the teeth *e* on the part *b* are formed in a line parallel or substantially parallel with the inner surface of the wall 3. By reason of this construction, the shaft 6 is permitted to have a rocking motion and as it rocks or moves endwise, it moves the part *b* of the block with it and this part *b* forms the wearing surface of the block.

From the foregoing it will be observed that the present improvement pertains to the making of the block into two parts with the outer surface of the block in a straight line and bearing upon a correspondingly straight line bearing surface of the inner wall of the box and the interlocking members between the two parts of the block, whereby there is an increased bearing surface between the block and the box, which very materially increases the wearing line of the engaging parts.

The other features of the construction shown in the drawing which have not been described, do not form any part of the present improvement and no description of them is either desirable or necessary.

Having thus described my invention, what I claim and desire to secure by Letters Patent is:

1. In a box-type of universal joint, the combination of a box having an inner straight bearing surface, a shaft extending into the box and having a laterally projected portion, of a two part bearing block between the projection of the shaft and the inner surface of the box, the outer member of the two part block having a straight bearing surface in engagement with the bearing surface of the box and the adjacent surfaces of the two parts of the block constructed to interlock with each other.

2. In a box-type of universal joint, the combination of a box having an inner straight bearing surface, a shaft having its end extending into the box and provided with a laterally projecting head, a two part bearing block between the head and the bearing surface of the box, the outer part of the block having a straight bearing surface in engagement with the straight bearing surface of the box and the adjacent faces of the two parts of the block having a plurality of intermeshing teeth which extend in a direction transverse the length of the joint.

3. In a box-type of universal joint, the combination with a box having an inner straight bearing surface, a shaft having one end projecting into the box and provided with a curved transversely toothed bearing surface, and a coöperating bearing member having an inner straight transversely toothed surface meshing with said curved toothed surface, said bearing member having also an outer straight bearing surface engaging said straight bearing surface of the box.

4. A bearing block for the box-type of universal joints, consisting of an inner and an outer member, the outer surface of the outer member having a straight bearing surface and the adjacent faces of the two members having intermeshing teeth, the teeth on the inner member being formed on the arc of a circle and the teeth on the outer member formed in a line substantially parallel with the outer straight bearing surface.

In testimony whereof I hereunto affix my signature in the presence of two witnesses.

PRESTON H. BREED.

Witnesses:
RAYMOND D. TUFTS,
REGINALD W. CORLEY.